(12) United States Patent
Kermelk et al.

(10) Patent No.: US 7,059,685 B2
(45) Date of Patent: Jun. 13, 2006

(54) FABRICATED VEHICLE WHEEL

(75) Inventors: Werner Kermelk, Much (DE); Gunter Stelzer, Bad Honnef (DE); Karl Rode, Konigswinter (DE); Alan Coleman, Southgate, MI (US); Thomas E. Heck, Monroe, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 10/836,828

(22) Filed: Apr. 30, 2004

(65) Prior Publication Data

US 2004/0227392 A1 Nov. 18, 2004

Related U.S. Application Data

(63) Continuation of application No. PCT/US02/17534, filed on May 31, 2002.

(51) Int. Cl.
*B60B 3/04* (2006.01)

(52) U.S. Cl. .............................. 301/64.101; 301/63.101

(58) Field of Classification Search ........... 301/63.101, 301/63.103, 63.104, 63.105, 64.101, 67, 301/80, 63.102; 29/894.322, 894.323, 394.325, 29/894.342, 894.344, 894.34
See application file for complete search history.

(56) References Cited

U.S. PATENT DOCUMENTS

| | | | |
|---|---|---|---|
| 1,376,390 A | | 4/1921 | Michelin |
| 1,544,242 A | | 6/1925 | Lavery |
| 1,743,944 A | | 1/1930 | Watrous |
| 1,750,483 A | | 3/1930 | Michelin |
| 1,890,546 A | | 12/1932 | Michelin |
| 1,897,375 A | * | 2/1933 | Greenwald ............. 301/64.101 |
| 2,143,457 A | * | 1/1939 | Sinclair .................. 301/35.625 |
| 2,162,751 A | * | 6/1939 | Sauzedde ..................... 301/6.2 |
| 2,187,032 A | * | 1/1940 | Horn et al. ............. 301/64.101 |
| 2,481,187 A | * | 9/1949 | Ash ....................... 301/64.101 |
| 3,623,774 A | * | 11/1971 | Funke et al. ........... 301/64.101 |
| 3,989,307 A | * | 11/1976 | Reppert ................. 301/64.101 |

(Continued)

FOREIGN PATENT DOCUMENTS

DE  1 605 545  3/1971

(Continued)

OTHER PUBLICATIONS

Motor Wheel Corporation Drawing L-36273, Feb. 24, 1967, Wheel Assem.~14x6JK—5" B.C.~5—Holes.

(Continued)

*Primary Examiner*—Russell D. Stormer
(74) *Attorney, Agent, or Firm*—MacMillan, Sobanski & Todd, LLC

(57) ABSTRACT

This invention relates to an improved fabricated spoked vehicle wheel. According to the invention, the fabricated vehicle wheel includes a conventional full wheel rim and a unique wheel disc joined to the wheel rim and defining a wheel axis. The wheel disc includes an inner wheel mounting pad, an outer annular rim connecting flange and a plurality of radial spokes connecting the inner wheel mounting pad to the rim connecting flange. The rim connecting flange extends in an axial direction and defines a side edge surface extending between each pair of adjacent spokes. A plurality of windows are formed in the wheel disc. Each of the windows has a predetermined shape defined by the adjacent spokes and the side edge surface of the rim connecting flange. The rim connecting flange and the side edge surface are configured such that the window extends to an outermost periphery of the wheel disc.

10 Claims, 6 Drawing Sheets

U.S. PATENT DOCUMENTS

| | | | |
|---|---|---|---|
| 4,124,051 A | | 11/1978 | Horton |
| 4,181,365 A | | 1/1980 | Kawaguchi et al. |
| 4,256,346 A | | 3/1981 | Kawaguchi et al. |
| 5,544,945 A | * | 8/1996 | Daudi .................. 301/64.101 |
| 5,899,537 A | * | 5/1999 | Abe et al. .............. 301/63.101 |
| 6,042,194 A | | 3/2000 | Fitz et al. |
| 6,244,669 B1 | | 6/2001 | Braunschweiler |
| 2003/0178887 A1 | * | 9/2003 | Sereno .................. 301/64.101 |

FOREIGN PATENT DOCUMENTS

| | | |
|---|---|---|
| DE | 26 39 483 | 3/1978 |
| FR | 891283 | 3/1944 |
| JP | 56-43001 | 4/1981 |
| JP | 57-70089 | 4/1982 |
| JP | 60-124501 | 7/1985 |
| JP | 62-34801 | 2/1987 |

OTHER PUBLICATIONS

Motor Wheel Corporation Drawing L-36274, Feb. 24, 1967, DISC~14"Dia. 5" BC~5—Holes.

1998 Full Face Vehicle Wheel.

1988 Bead-Seat Attached Vehicle Wheel.

1994 Well-Attached Vehicle Photo #1.

1994 Well-Attached Vehicle Photo #2.

1986 Well-Attached Vehicle Wheel.

* cited by examiner

FABRICATED VEHICLE WHEEL

CROSS-REFERENCE TO RELATED APPLICATIONS

This application is a continuation of PCT/US02/17534, filed May 31, 2002.

BACKGROUND OF THE INVENTION

This invention relates in general to vehicle wheels and in particular to an improved fabricated vehicle wheel.

A conventional fabricated vehicle wheel is typically of a two-piece construction and includes an inner disc and an outer "full" rim. The disc can be fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the disc is used. In both types of constructions, the outer annular portion of the disc is typically secured to the rim by welding.

SUMMARY OF THE INVENTION

This invention relates to an improved fabricated spoked vehicle wheel. According to the invention, the fabricated vehicle wheel includes a conventional full wheel rim and a unique wheel disc joined to the wheel rim and defining a wheel axis. The wheel disc includes an inner wheel mounting pad, an outer annular rim connecting flange and a plurality of radial spokes connecting the inner wheel mounting pad to the rim connecting flange. The rim connecting flange extends in an axial direction and defines a side edge surface extending between each pair of adjacent spokes. A plurality of windows are formed in the wheel disc. Each of the windows has a predetermined shape defined by the adjacent spokes and the side edge surface of the rim connecting flange. The rim connecting flange and the side edge surface are configured such that the window extends to an outermost periphery of the wheel disc.

Other advantages of this invention will become apparent to those skilled in the art from the following detailed description of the preferred embodiments, when read in light of the accompanying drawings.

DESCRIPTION OF THE PREFERRED EMBODIMENTS

Figure 1:
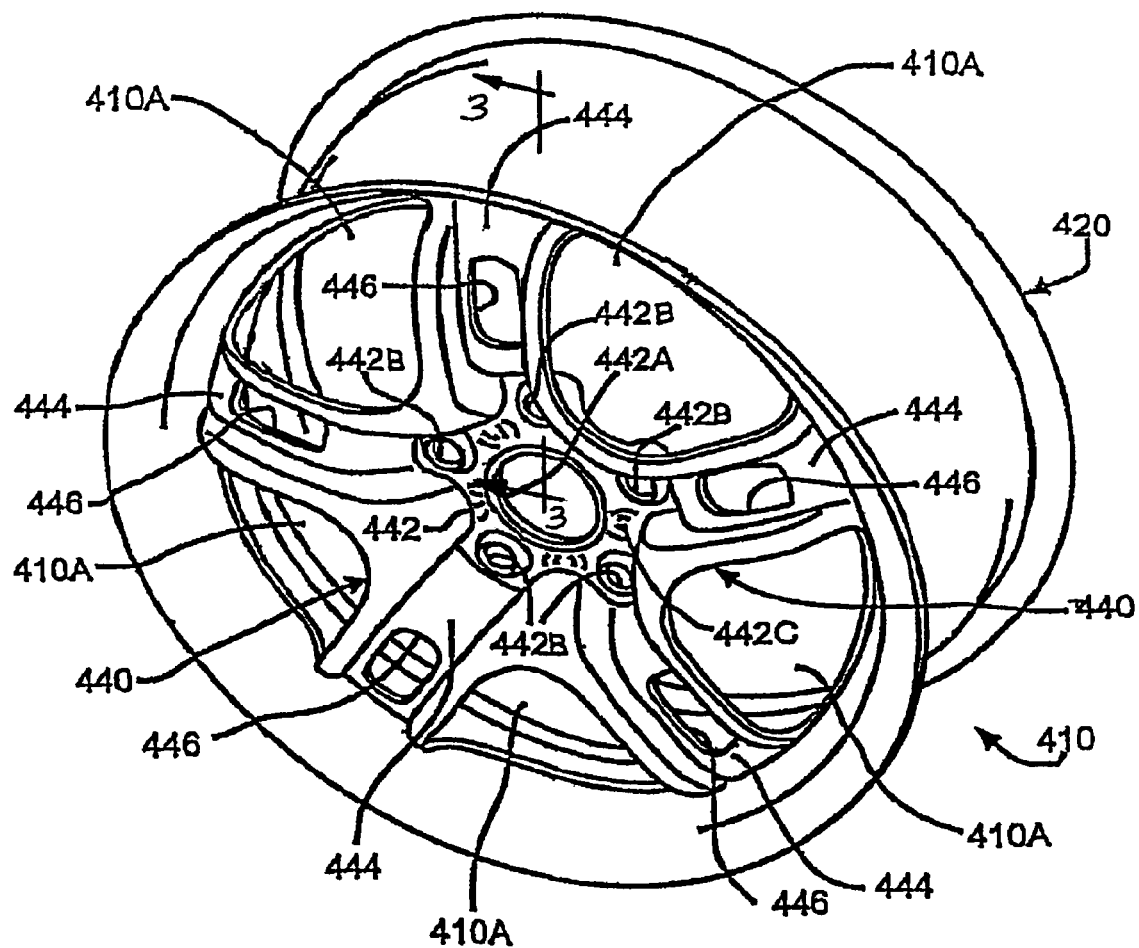
FIG. 1 is a view of a first embodiment of a fabricated vehicle wheel in accordance with the present invention.
Figure 2:
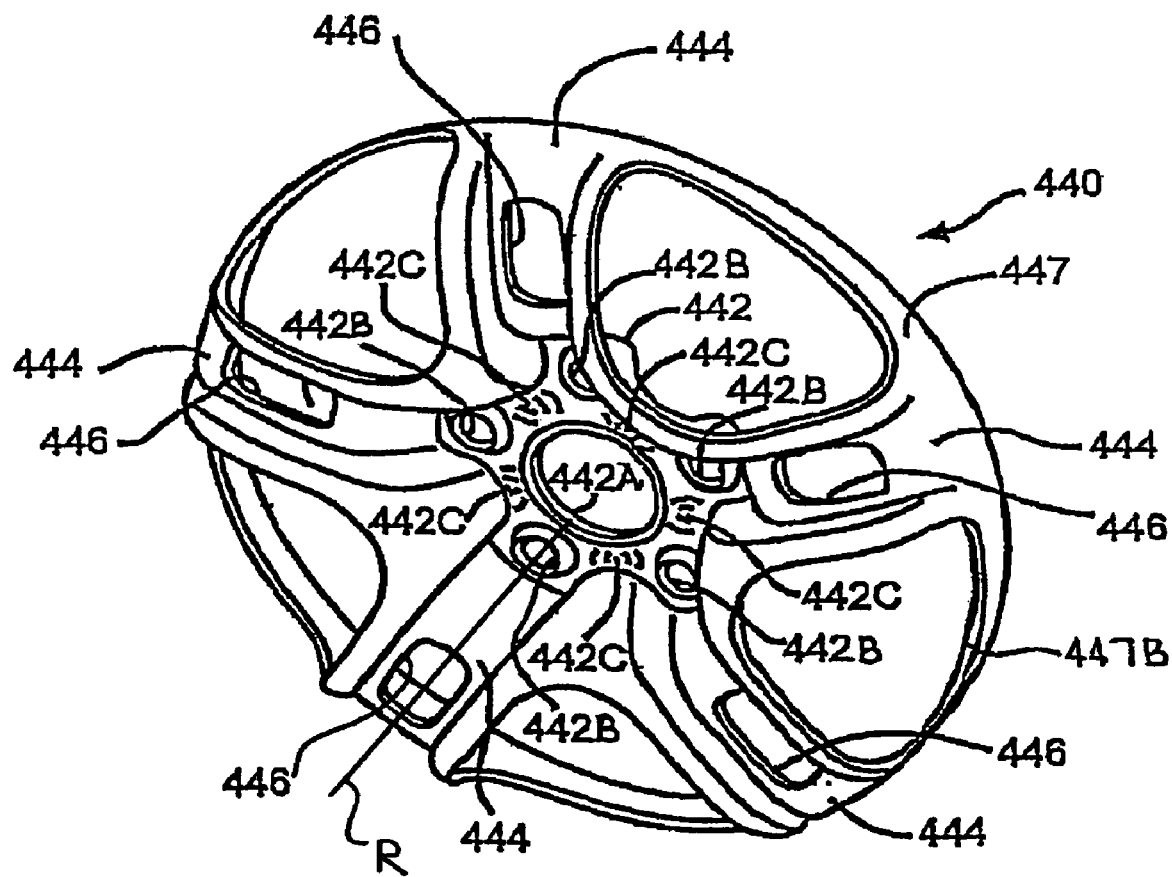
FIG. 2 is a view of the wheel disc illustrated in FIG. 1.
Figure 3:
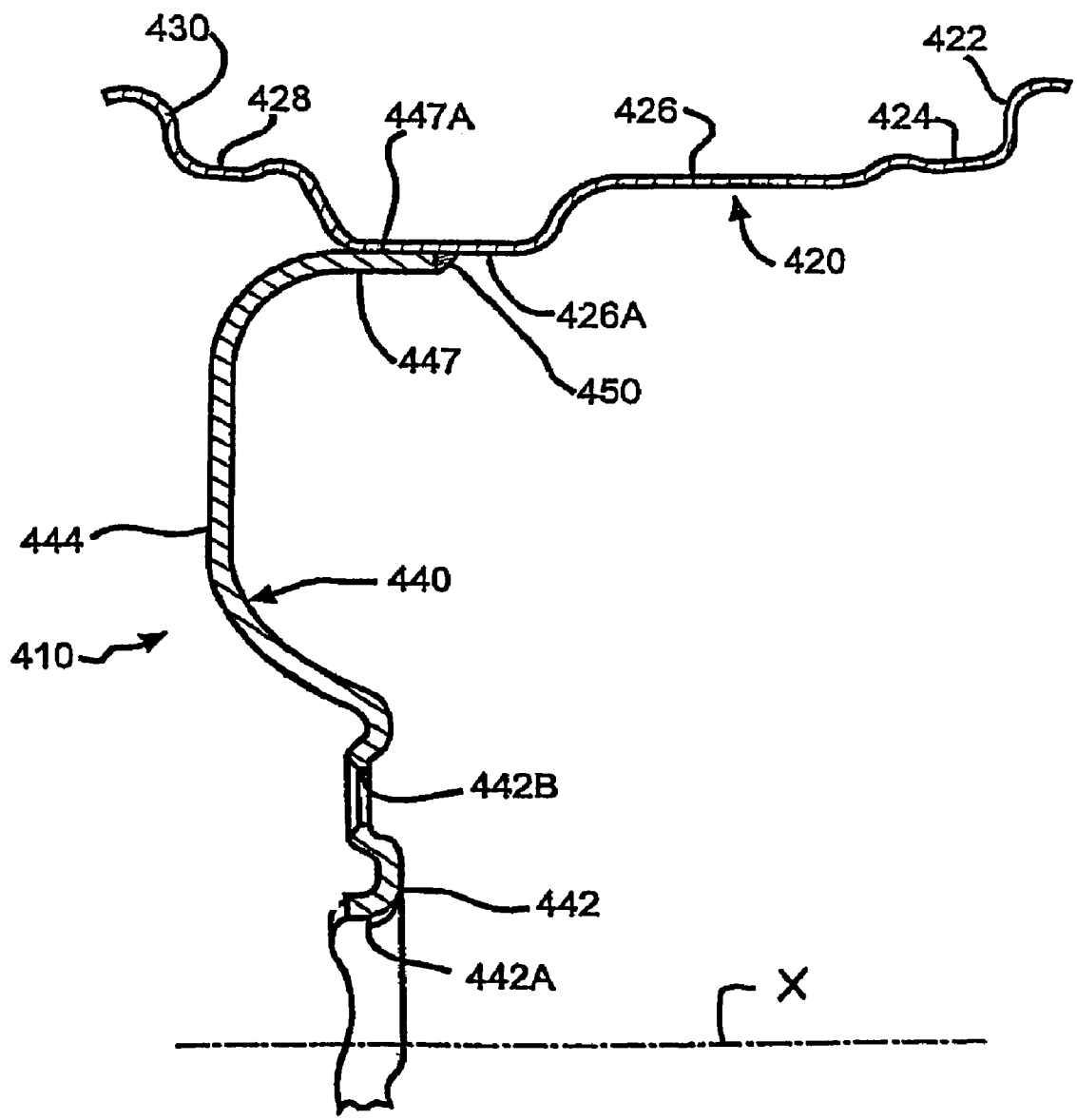
FIG. 3 is a sectional view of a portion of the vehicle wheel taken along line 3—3 of FIG. 1, except showing solid spokes.

Referring now to FIGS. 1–3, there is illustrated a first embodiment of a fabricated vehicle wheel, indicated generally at 410, produced in accordance with the present invention. The vehicle wheel 410 produced according to this invention is illustrated as being a fabricated drop center or well attached vehicle wheel. The fabricated bead drop center vehicle wheel 410 includes a full wheel rim 420 and an inner wheel disc 440 which are constructed and joined together in accordance with the present invention.

The wheel rim 420 is a fabricated rim formed from a suitable material, such as for example, steel, aluminum or alloys thereof, magnesium or titanium. As shown in FIG. 25, the wheel rim 420 includes an inboard tire bead seat retaining flange 422, an inboard tire bead seat 424, a generally axially extending well 426, an outboard tire bead seat 428, and an outboard tire bead seat retaining flange 430. The well 426 includes an inner surface 426A.

The wheel disc 440 is fabricated or otherwise formed from a suitable material, such as for example, steel, aluminum or alloys thereof, steel, magnesium, or titanium. The wheel disc 440 defines a wheel axis X and includes a generally centrally located wheel mounting surface or portion 442, a plurality of outwardly extending spokes 444, and an outer band or flange 447. In the illustrated embodiment, the disc 440 includes five of such spokes 444 which are shown as being formed integral with the wheel mounting surface 442 and the outer flange 447. Alternatively, the number and/or the construction of the spokes 444 can be other than illustrated if so desired. For example, the vehicle wheel 410 can include less than five spokes 444 or more than five spokes 444. Also, the spokes 444 and the outer flange 447 can be formed integral with one another but separate from the wheel mounting surface 442 of the disc 440 and joined thereto by a suitable method.

The wheel mounting surface 442 is provided with a centrally located pilot aperture 442A and a plurality of lug bolt receiving holes 442B circumferentially spaced around the pilot aperture 442A. In the illustrated embodiment, the wheel mounting surface 442 includes five of such lug bolt receiving holes 442B which are preferably provided in the wheel mounting surface 442 in line with a respective one of each of the spokes 444. Alternatively, the number and/or the location of the lug bolt receiving holes 442B can be other than illustrated if so desired. The lug bolt receiving holes 442B receive lug bolts (not shown) and nuts (not shown) for securing the vehicle wheel 410 on an axle (not shown) of a vehicle.

The mounting surface 442 further includes a plurality of strengthening ribs 442C provided therein. In the illustrated embodiment, a rib 442C is located between each pair of lug bolt receiving holes 442B. Each of the ribs 442C is defined by a raised or embossed area which extends outwardly from or above the mounting surface 442. The ribs 442C are operative to strengthen the mounting surface 442 to keep it from flexing during vehicle operation thereby improving the fatigue life of the associated vehicle wheel. Alternatively, the spacing, location, number and/or configuration of the ribs 442C can be other than illustrated and described if so desired.

The wheel disc 440 may also include one or more spoke openings 446 formed in one or more of each of the spokes 444. In the illustrated embodiment of FIGS. 1 and 2, one of such spoke openings 446 is provided in each of the spokes 444. Alternatively, the number and/or the location of the spoke openings 446 can be other than illustrated if so desired. Also, as shown in FIG. 3, the spoke 444 can be formed as a solid spoke not having the spoke opening 446 formed therein. As shown in this embodiment, the outer flange 447 extends solely in a generally axial direction, defies an annular mounting flange and includes an outer surface 447A and a side edge surface 447B (shown in FIG. 2), extending between adjacent pairs of spokes 444. As shown in FIG. 3, the side edge surface 447B faces in a generally axial outboard direction.

To assemble the vehicle wheel 410 in the illustrated embodiment, the wheel rim 420 and the wheel disc 440 are located relative to one another in a predetermined position. In particular, the outer surface 447A of the mounting flange 447 is positioned adjacent the inner surface 426A of the well 426 of the wheel rim 420 and a weld 450 (shown in FIG. 3) is applied to join the wheel disc 440 and the wheel rim 420 together to produce the fabricated well attached vehicle wheel. As can be seen in FIG. 1, due to the construction of the wheel disc 440, the resultant wheel 410 has a relatively large vent window 410A formed therein between each pair of the spokes 444. Also, while the wheel disc 440 is shown for use in constructing a fabricated well attached vehicle wheel, the wheel disc 440 could be used to produce other types of fabricated vehicle wheels. For example, the wheel disc 440 could be used to produce a fabricated bead seat attached vehicle wheel or a fabricated full face vehicle wheel. Also, as shown in FIG. 2, each spoke 444 defines a radial line R intersecting the wheel axis X and each spoke 444 is preferably symmetrical with respect to the radial line R.

Figure 4:
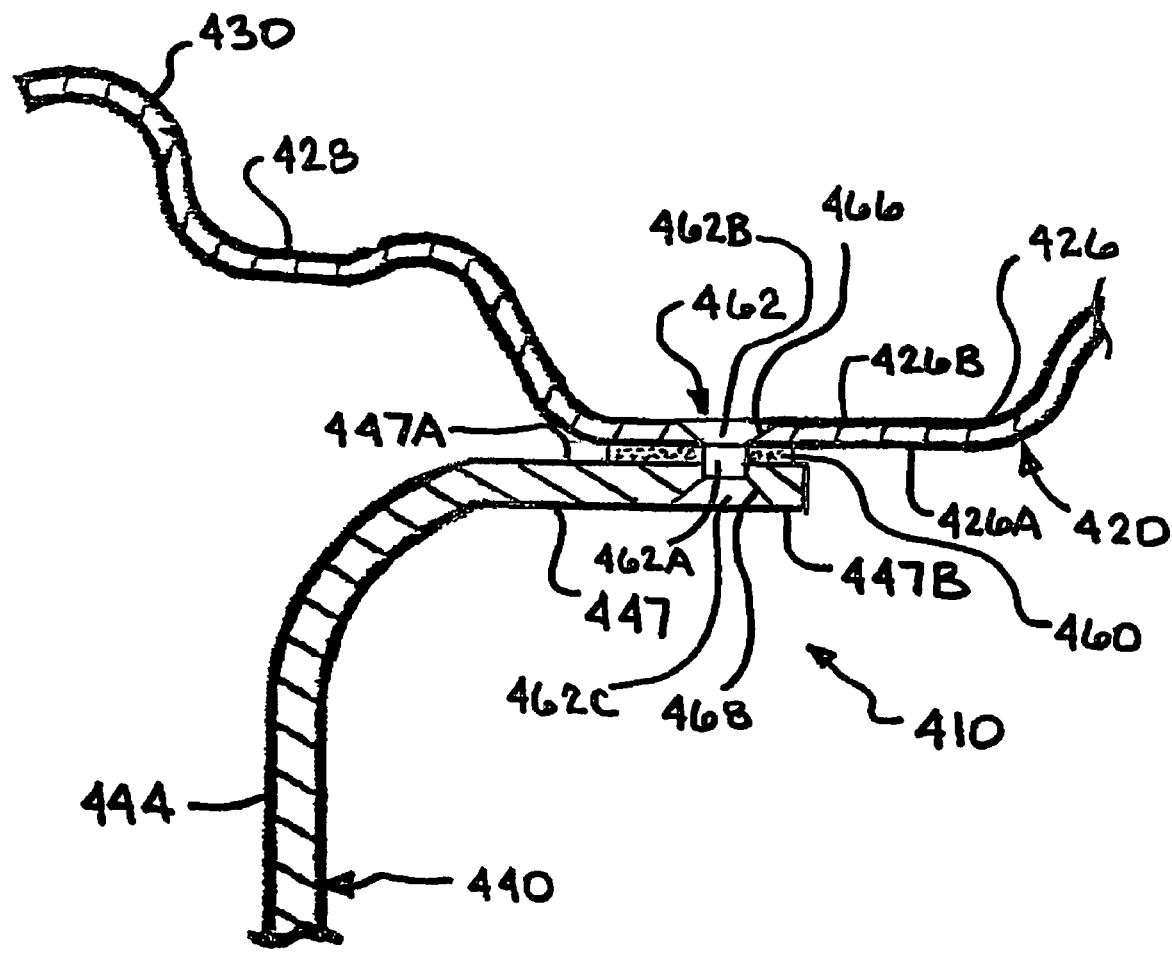
FIG. 4 is an enlarged view of a portion of the vehicle wheel illustrated in FIG. 3 showing an alternate method for joining the wheel disc to the wheel rim.

Alternatively, as shown in FIG. 4, the wheel disc 440 and the wheel rim 420 can be secured together by using an adhesive 460 and a plurality of suitable fasteners 462 (only one of such fasteners 462 being illustrated in FIG. 4). Preferably, a suitable adhesive 460 is first applied to the outer surface 447A of the mounting flange 447. A suitable adhesive 460 is a one part epoxy available under the name BETAMATE® 4601, manufactured by Dow Chemical Company of Midland, Mich. Alternatively, the type and/or the application of the adhesive 460 can be other than illustrated and described if so desired. For example, the adhesive 460 can be first applied to the inner surface 426A of the well 426 of the wheel rim 420.

Next, the wheel rim 420 and the wheel disc 440 are located relative to one another in a predetermined position. In this position, the well inner surface 426A is disposed adjacent the mounting flange outer surface 447A. While in this position, a plurality of wheel rim holes 466 and mounting flange holes 468 are preferably formed in the wheel rim 420 and wheel disc 440, respectively, at the same time by a suitable method, such as for example, by piercing, drilling or laser cutting. Forming the holes 466 and 468 in this manner ensures that the holes are in proper alignment. Next, a suitable fastener 462 is installed in each of the aligned holes 466 and 468 to thereby join the wheel rim 420 and the wheel disc 440 together. Alternatively, the holes 466 and 468 can be separately provided in one or both of the wheel rim 420 and the wheel disc 440 prior to assembly if so desired.

In the illustrated embodiment, the fastener 462 is a rivet and includes a generally round body 462A, an outer or head portion 462B, and an inner portion 462C. Also, the holes 466 and 468 are preferably countersunk holes so that when the rivet 462 is installed no portion of the rivet 462 protrudes outside of a well outer surface 426B and a mounting flange inner surface 447B of the wheel rim 420 and the wheel disc 440, respectively. Alternatively, the type, configuration, location and/or the number of fasteners 462 that are used can be other than illustrated if so desired.

Figure 5:
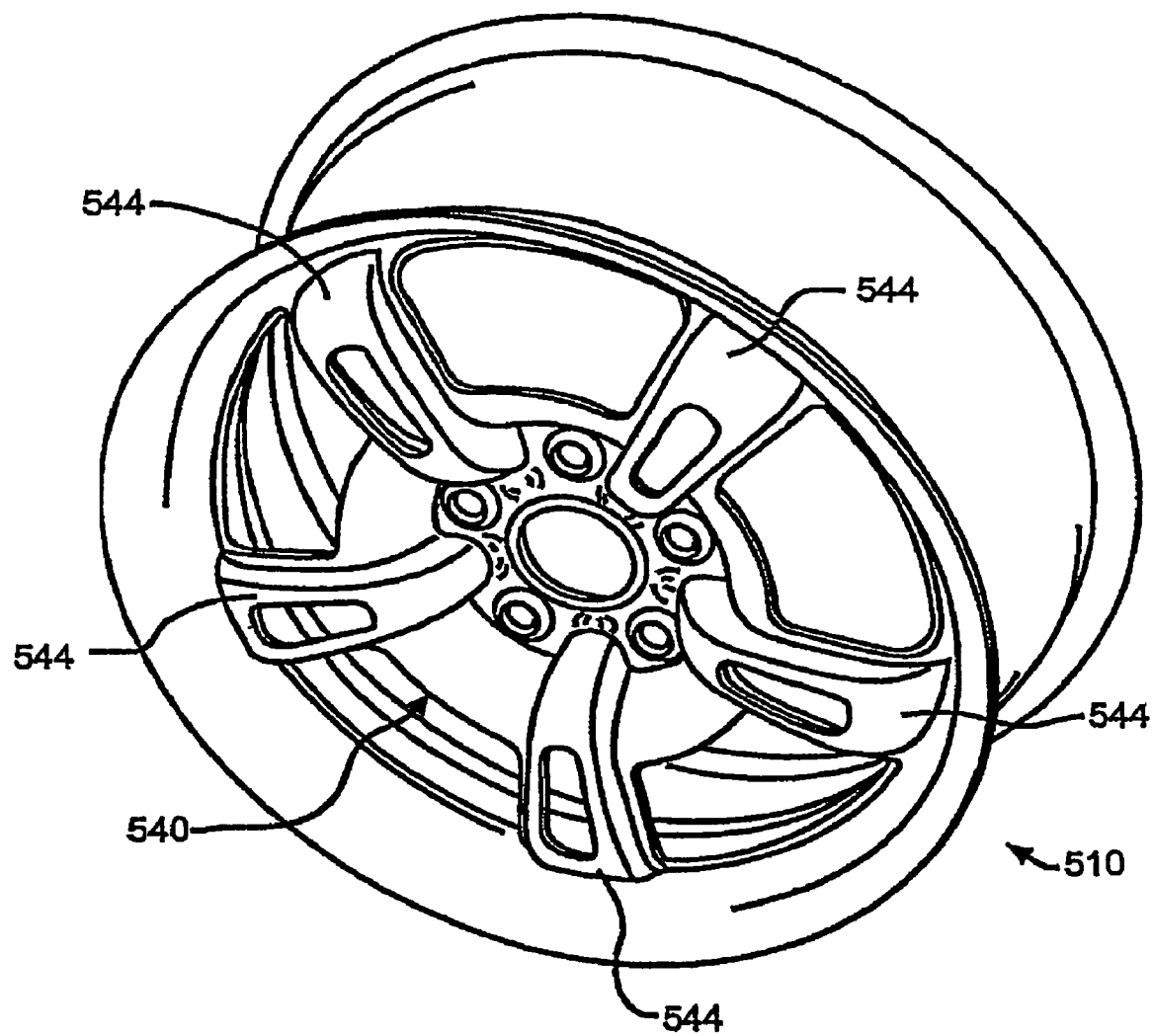
FIG. 5 is a view of a second embodiment of a fabricated vehicle wheel in accordance with the present invention.
Figure 6:
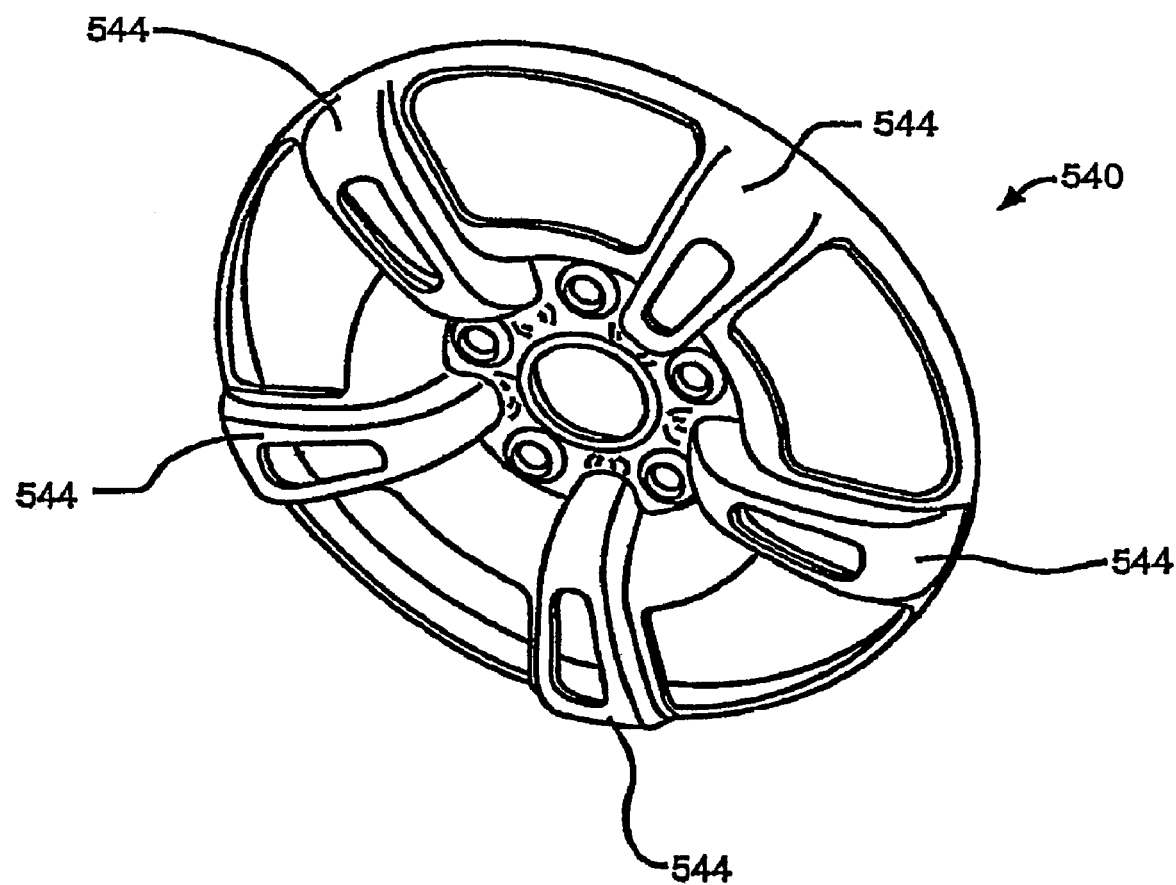
FIG. 6 is a view of the wheel disc illustrated in FIG. 5.

Referring now to FIGS. 5 and 6, there is illustrated a second embodiment of a fabricated vehicle wheel, indicated generally at 510, produced in accordance with the present invention. The vehicle wheel 510 produced according to this invention is illustrated as being a fabricated drop center vehicle wheel. In this embodiment, spokes 544 of a wheel disc 540 are inverted or reversed compared to the spokes 444 of the wheel disc 440 of the vehicle wheel 410 illustrated in FIGS. 1–3. Thus, in this embodiment, the spokes 544 of the wheel disc 540 project outwardly as opposed to the spokes 444 of the wheel disc 440 which project inwardly.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A fabricated vehicle wheel comprising:
   a wheel rim including an inboard tire bead seat retaining flange, an inner tire bead seat, a well, an outer tire bead seat, and an outboard tire bead seat retaining flange;
   a wheel disc joined to said wheel rim and defining a wheel axis, said wheel disc including an inner wheel mounting pad, an outer annular rim connecting flange and a plurality of radial spokes connecting said inner wheel mounting pad to said rim connecting flange, said rim connecting flange extending solely in an axial direction, said rim connecting flange defining a side edge surface extending between each pair of adjacent spokes; and
   a separate window formed in said wheel disc between each pair of adjacent spokes, each window having a predetermined shape defined by said adjacent spokes and said side edge surface of said rim connecting flange such that each window extends to an outermost periphery of said wheel disc.

2. The fabricated vehicle wheel according to claim 1 wherein each of said spokes defines a radial line intersecting said wheel axis and each of said spokes is symmetrical with respect to said radial line.

3. The fabricated vehicle wheel according to claim 2 further including a separate lug bolt hole formed in said inner wheel mounting pad between each pair of adjacent spokes, each of said lug bolt holes located along said radial line of each of said spokes.

4. The fabricated vehicle wheel according to claim 3 wherein said inner wheel mounting pad includes a strengthening rib provided therein which is located between each pair of adjacent lug bolt holes.

5. The fabricated vehicle wheel according to claim 1 wherein said wheel disc and said wheel rim are joined together by welding.

6. The fabricated vehicle wheel according to claim 1 wherein said wheel rim includes a plurality of holes formed therein, said wheel disc includes a plurality of holes formed therein, and wherein said wheel disc and said wheel rim are joined together by a plurality of fasteners extending through said holes of said wheel rim and said holes of said wheel disc and by an adhesive disposed between adjacent surfaces of said wheel rim and said wheel disc.

7. The fabricated vehicle wheel according to claim 1 wherein said spokes are formed integral with said inner wheel mounting pad and said rim connecting flange.

8. The fabricated vehicle wheel according to claim 1 wherein each of said spokes includes a separate opening, formed therein.

9. A fabricated vehicle wheel comprising:
- a wheel rim including an inboard tire bead seat retaining flange, an inner tire bead seat, a well, an outer tire bead seat, and an outboard tire bead seat retaining flange;
- a wheel disc joined to said wheel rim and defining a wheel axis, said wheel disc including an inner wheel mounting pad, an outer annular rim connecting flange and a plurality of radial spokes connecting said inner wheel mounting pad to said rim connecting flange, said rim connecting flange extending in an axial direction and including a side edge surface extending between each pair of adjacent spokes and facing in a generally axial outboard direction; and
- a separate window formed in said wheel disc between each pair of adjacent spokes, each window having a predetermined shape defined by said adjacent spokes and said side edge surface of said rim connecting flange such that each window extends to an outermost periphery of said wheel disc;
- wherein each of said spokes defines a radial line intersecting said wheel axis and each of said spokes is symmetrical with respect to said radial line, and wherein a separate lug bolt hole is formed in said inner wheel mounting pad between each pair of adjacent spokes, each of said lug bolt holes located along said radial line of each of said spokes.

10. The fabricated vehicle wheel according to claim 9 wherein each of said spokes includes a separate opening formed therein.

* * * * *